United States Patent [19]

Sawada et al.

[11] Patent Number: 5,203,748

[45] Date of Patent: Apr. 20, 1993

[54] ROTARY DRIVING SYSTEM AND ROBOT OPERATING THEREON

[75] Inventors: Yasuhiro Sawada, Chofu; Yusaku Azuma; Takeo Tanita, both of Yokohama; Yasuo Karube, Inashiki; Teiji Ohsaka, Ushiku, all of Japan

[73] Assignee: Canon Kabushiki Kaisha, Tokyo, Japan

[21] Appl. No.: 695,995

[22] Filed: May 6, 1991

[30] Foreign Application Priority Data

| May 9, 1990 | [JP] | Japan | 2-117646 |
| May 9, 1990 | [JP] | Japan | 2-117647 |
| May 9, 1990 | [JP] | Japan | 2-117648 |
| May 9, 1990 | [JP] | Japan | 2-117649 |
| May 10, 1990 | [JP] | Japan | 2-118679 |
| Jun. 22, 1990 | [JP] | Japan | 2-162867 |
| Jul. 16, 1990 | [JP] | Japan | 2-185281 |

[51] Int. Cl.$^5$ .............................................. G05G 11/00
[52] U.S. Cl. ................... 475/183; 74/479 B; 901/25
[58] Field of Search ............. 74/212, 479; 475/183; 901/25

[56] References Cited

U.S. PATENT DOCUMENTS

| 4,435,998 | 3/1984 | Kinoshita | 74/212 X |
| 4,648,288 | 3/1987 | Kato et al. | 74/212 X |
| 4,691,595 | 9/1987 | Kinanen et al. | 74/212 X |
| 4,763,055 | 8/1988 | Daggett et al. | 901/25 X |
| 4,907,467 | 3/1990 | Toyoda et al. | 74/479 |
| 4,918,344 | 4/1990 | Chikamori et al. | 475/183 X |
| 4,951,517 | 8/1990 | Azuma et al. | 901/25 X |
| 4,964,312 | 10/1990 | Kraus | 74/212 X |
| 5,037,361 | 8/1991 | Takahashi | 475/183 X |
| 5,046,915 | 9/1991 | Azuma et al. | 901/25 X |

FOREIGN PATENT DOCUMENTS

| 58-39873 | 3/1983 | Japan . |
| 58-57554 | 4/1983 | Japan . |
| 60-18651 | 1/1985 | Japan . |

Primary Examiner—Leslie A. Braun
Assistant Examiner—Daniel Wittels
Attorney, Agent, or Firm—Fitzpatrick, Cella, Harper & Scinto

[57] ABSTRACT

A planetary roller speed reducer includes a sun roller mounted rotatably on a pedestal and a plurality of planetary rollers having a central portion with a narrowed diameter and mounted rotatably on the pedestal. The sun roller circumscribes large-diameter portions of the planetary rollers which work as a first reduction part, and an outer ring working as an output shaft circumscribes a small-diameter portion working as a second reduction part. A rotary driving system comprises a support fixed to the pedestal and disposed within the outer ring on an extension of the sun roller, and a turning angle detector fixed to the outer ring detects a turning angle between the support and the outer ring.

9 Claims, 17 Drawing Sheets

ROTARY DRIVING SYSTEM AND ROBOT OPERATING THEREON

BACKGROUND OF THE INVENTION

1. Field of the Invention

The present invention relates to a rotary driving system for driving a robot arm by a planetary roller speed reducer with a plurality of planetary rollers disposed around a sun roller.

2. Related Background Art

Conventional planetary roller speed reducer with planetary rollers constructed in two stages includes those which have been disclosed in Japanese patent application Laid-open No. 58-39873, Japanese patent application Laid-open No. 58-57554 and Japanese patent application Laid-open No. 60-18651.

Those speed reducers disclosed as above were not equipped with turning angle detection means for detecting turning angles of an output shaft integrally therewith, but a position detector such as a rotary encoder or the like was provided particularly on the output shaft of a motor for detection of the turning angles.

Since the turning angles are detected by the position detector such as an encoder which is mounted on the motor output shaft, when said conventional speed reducers are used on an apparatus requiring high precision for placing a robot arm and others in position, error is inevitable such that a positioning reproducibility of high precision is not realizable due to slip arising internally.

SUMMARY OF THE INVENTION

An object of the present invention is to provide a rotary driving system for driving a robot arm by a planetary roller speed reducer free from the aforementioned error.

Further the present invention proposes an improvement of a rotary driving system provided with a reduction function comprising a small-diametral sun roller coupled to a driving motor, a plurality of planetary rollers disposed around the sun roller and an output shaft coupled to the planetary rollers, and particularly proposes an improvement of pressing means for transferring rotations from the sun roller to the planetary rollers.

That is, according to one example of the present invention, the planetary rollers are provided with a large-diametral portion to come in contact with the sun roller and a small-diametral portion to come in contact with the output shaft side. A ring member for operating a pressing force is inserted between the small-diametral portion of the planetary roller and the output shaft, and a pressing surface of the ring member is tapered off, thereby adjusting the pressing force.

Further in the present invention, an auxiliary roller is mounted on the planetary roller so as to have a diametral portion whereat the planetary roller come in contact with the sun roller at two points on an axis of the roller, and the auxiliary roller is constructed detachably therefrom, thus proposing a construction ready for adjusting the pressing force by the ring member.

Further, the pressing force can be adjusted easily by forming a slitting portion on the ring member relating to the present invention.

Further, in a rotary driving system having a sun roller coupled to a motor, a plurality of planetary rollers, and pressed around the sun roller, an output shaft coupled to the planetary rollers, the present invention proposes a construction such that a turning position detector such as a rotary encoder or the like is connected to the output shaft, rotation of the motor is decelerated and so transferred to the output shaft, and a turning position of the output shaft is detected directly without causing an error thereon. Further proposed is a construction wherein the planetary rollers rotate on the axes and revolve around the sun roller, and a construction wherein the planetary rollers only rotate on the axes without revolving around, thereby providing a rotary driving system operable for general purpose and a rotary driving system for which a high precision of the turning position detection is required. Still further, the present invention proposes that the aforementioned rotary driving systems be used for driving robots.

BRIEF DESCRIPTION OF THE DRAWINGS

FIG. 1 to FIG. 11 represent a rotary driving system given in a first embodiment of the present invention and a robot operating on the rotary driving system, wherein FIG. 1 is a structural drawing of a rotary driving system for robot arms; FIG. 2 is a longitudinal sectional view of a speed reducer; FIG. 3 is an explanatory drawing for adjusting a pressing force working between planetary rollers and an output shaft; FIG. 4 is a sectional view taken on line X—X of FIG. 2; FIGS. 5A, and 5B represent a pre-pressure ring, wherein FIG. 5A is a plan view, FIG. 5B is a sectional view taken on line Y—Y of FIG. 5A; FIG. 6 is a drawing indicating a characteristic of the prepressure ring with reference to adjustment; FIG. 7 is a block diagram representing a control system of the first embodiment; FIG. 8 is a structural drawing representing a multi-articulated robot used in the first embodiment; FIG. 9 is a block diagram representing a control system of the second embodiment; FIG. 10 is a drawing showing each parameter used for the control system of FIG. 9; and FIG. 11 is a flowchart showing a control content of the control system shown in FIG. 9.

FIG. 12 to FIG. 15 represent a rotary driving system given in the second embodiment of the present invention and a robot operating on the rotary driving system, wherein FIG. 12 is a longitudinal sectional view of a speed reducer; FIGS. 13A, 13B are explanatory drawings of a pressing ring and pressing means for the pressing ring, respectively; FIG. 14 is a longitudinal sectional view of another rotary driving system; and FIG. 15 is an explanatory drawing when the system is applied for driving a robot arm.

FIG. 16 and FIG. 17 represent a third embodiment of a rotary driving system in which a hollow turning position detector is incorporated, wherein FIG. 16 is a longitudinal sectional view of the rotary driving system; and FIG. 17 is an explanatory drawing of a constructional part for incorporating the hollow turning position detector therein.

DETAILED DESCRIPTION OF PREFERRED EMBODIMENTS

Preferred embodiments of the present invention will now be described with reference to the accompanying drawings.

Figure 1:
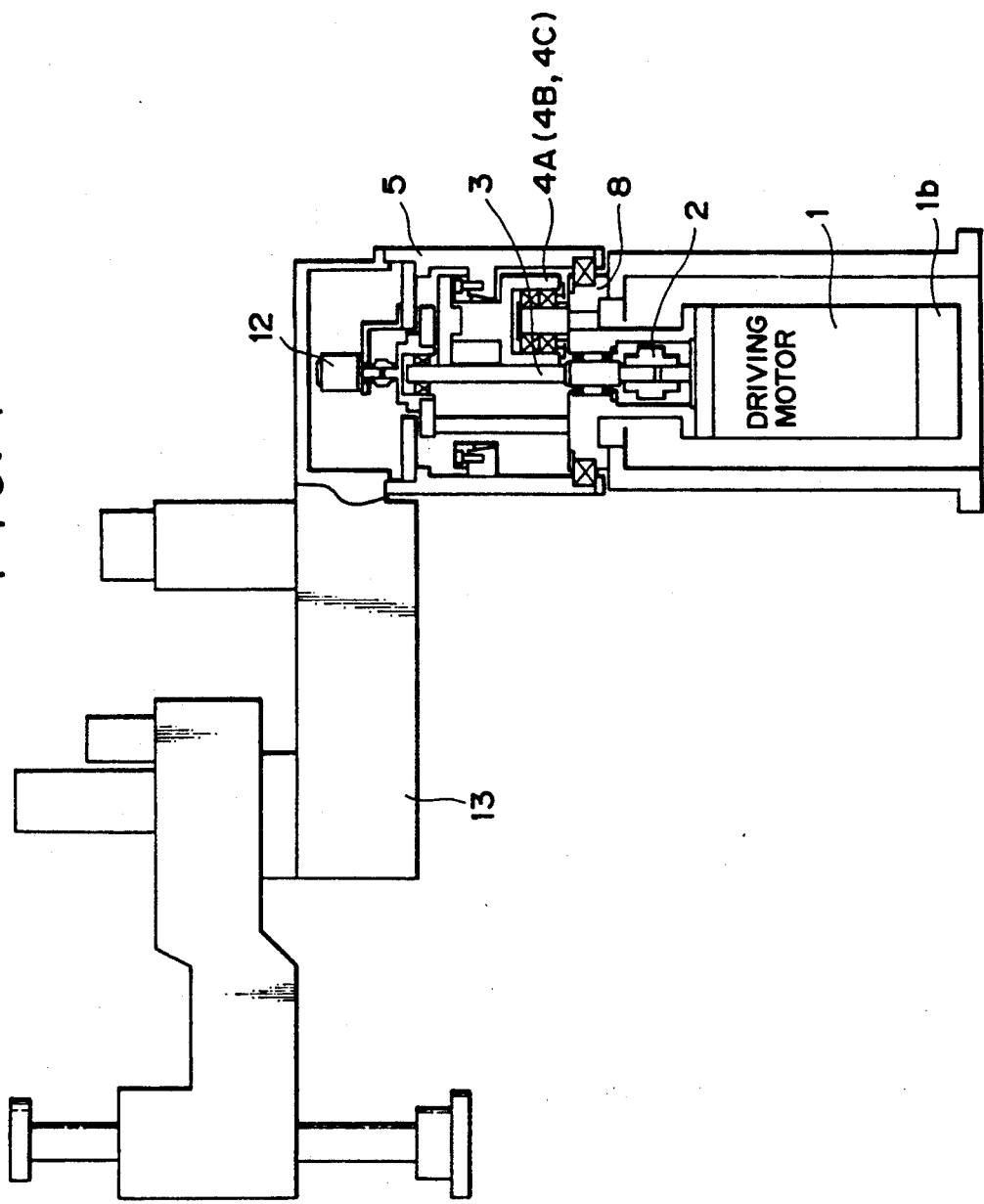
Figure 2:
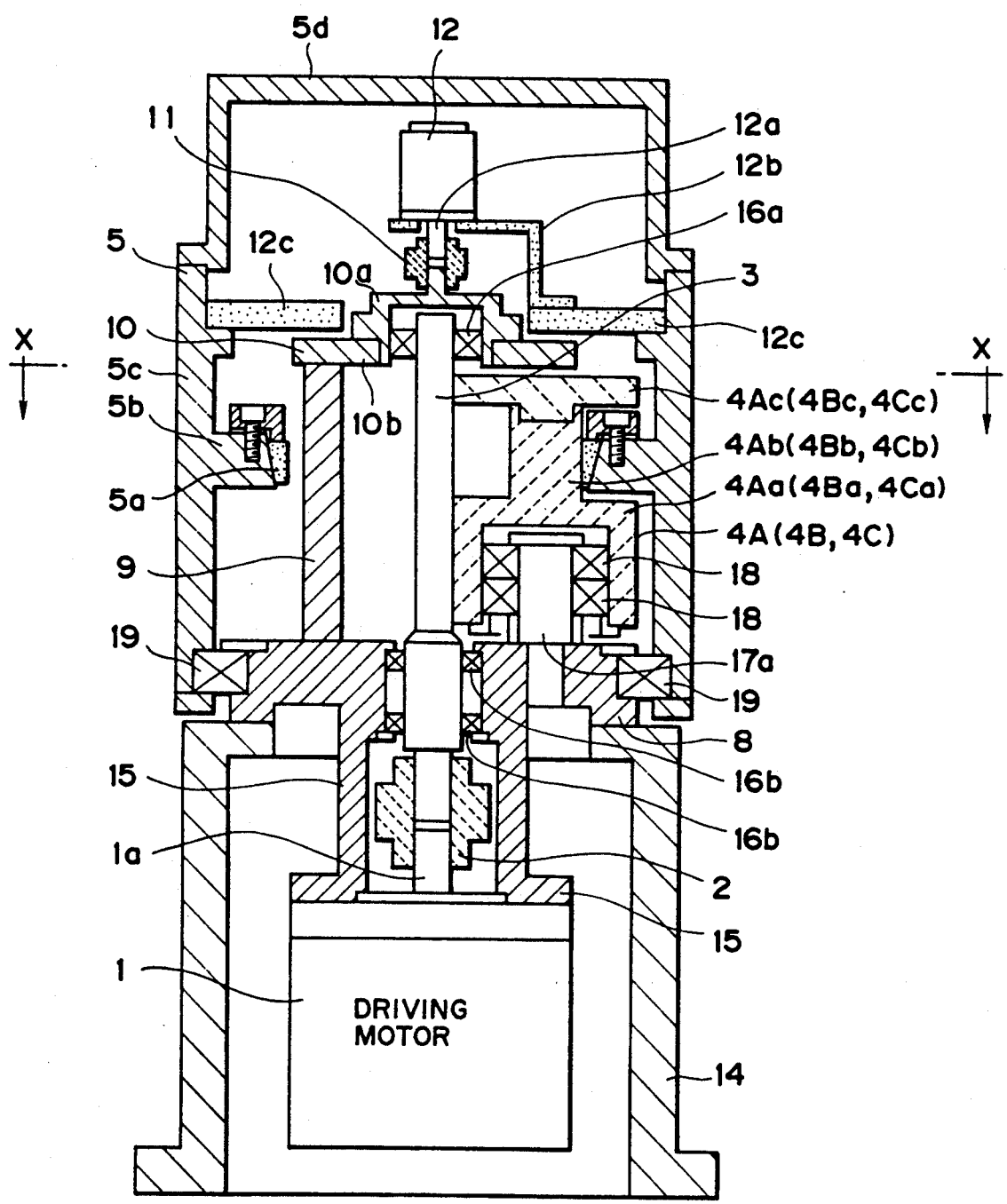
Figure 3:
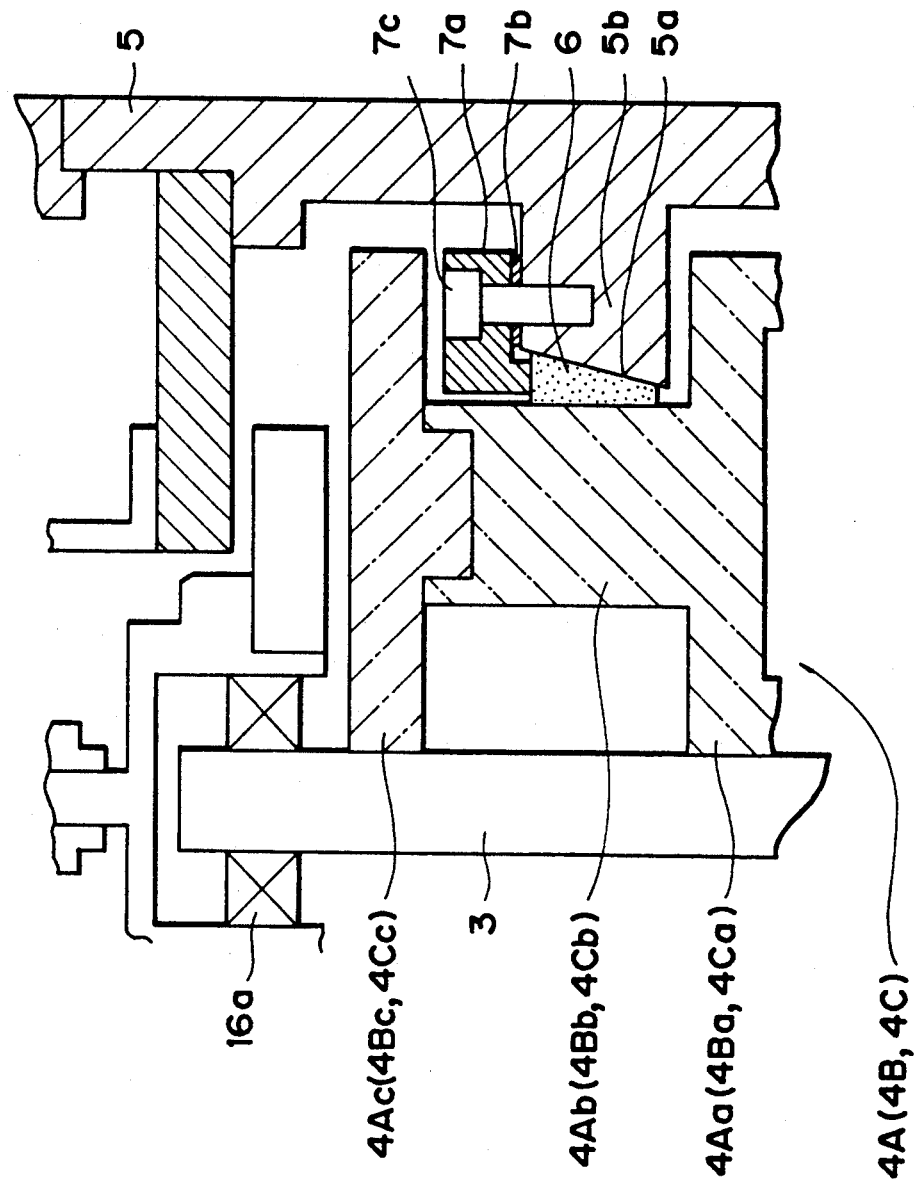
Figure 4:
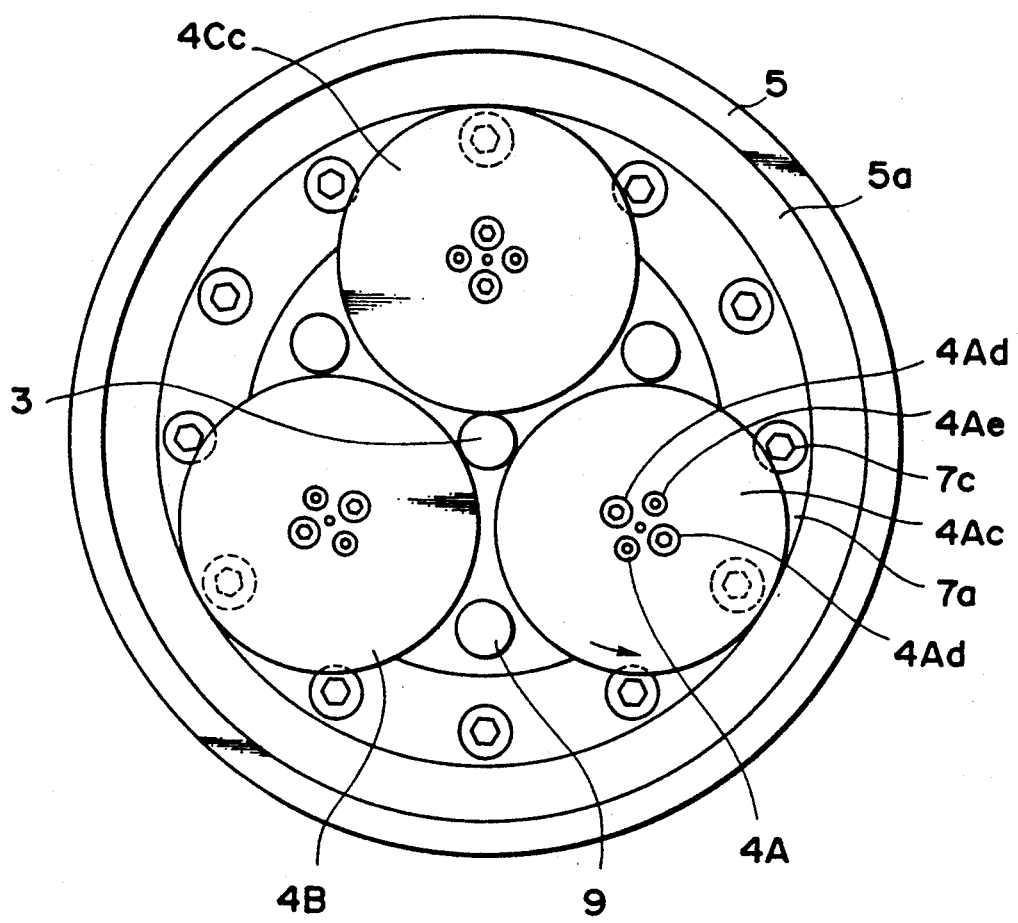
Figure 5A:
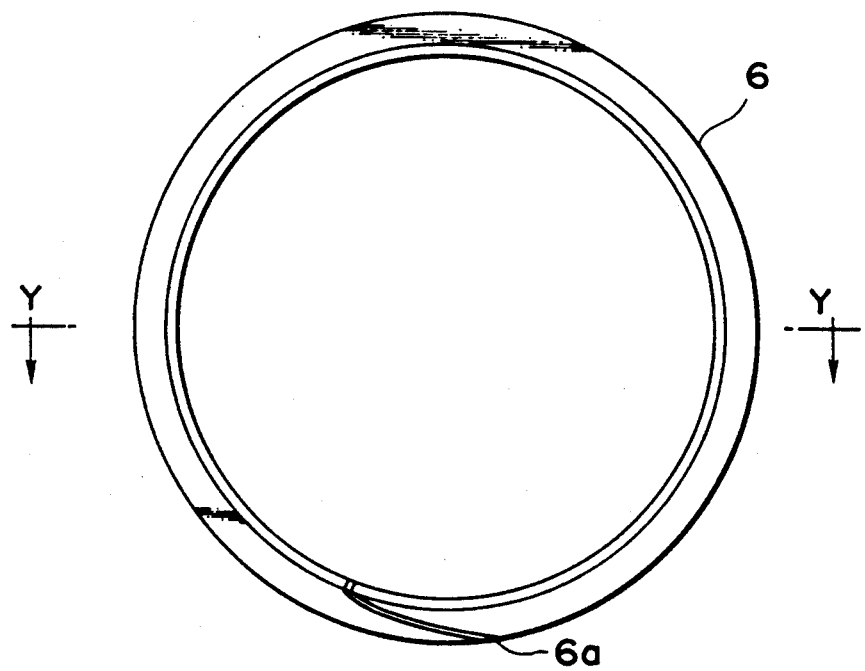
Figure 5B:
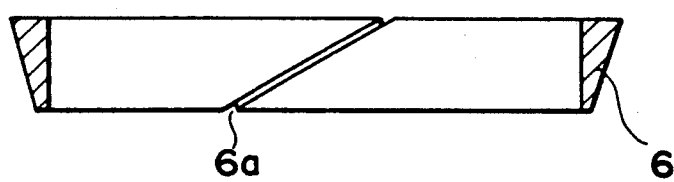

FIG. 1 is a structural drawing representing a rotary driving system for robot arms which is given in a first embodiment of the present invention; FIG. 2 is a longitudinal sectional view showing in detail a planetary roller speed reducer used for the embodiment of FIG. 1; FIG. 3 is an enlarged sectional view showing a pre-pressure ring 6 of FIG. 2 and its periphery; FIG. 4 is a sectional view taken on line X—X of FIG. 2; FIG. 5A and FIG. 5B represent the pre-pressure ring 6, wherein FIG. 5A is a plan view, and FIG. 5B is a sectional view taken on line Y—Y of FIG. 5A.

Referring first to a planetary roller speed reducer, a driving motor 1 (hereinafter referred to as motor 1) is mounted on a motor fitting flange 15 of a speed reducer base 8 working as a pedestal, and the speed reducer base 8 is fixed to a speed reducer ground way 14. An output shaft 1a for transferring a rotational output of the motor 1 is linked with a sun roller 3 by a coupling 2. The sun roller 3 is a cylinder in shape with a smooth surface. To keep the sun roller 3 from whirling by pressing three planetary rollers 4A, 4B, 4C thereto, the sun roller 3 is supported rotatably by three bearings, that is, by a bearing 16a on its upper portion and a pair of bearings 16b on the lower portion (the bearing 16a being fixed to the sun roller 3 in the present embodiment). A turning force of the sun roller 3 is transferred by a frictional force to the three planetary rollers 4A, 4B, 4C each having same maximum outside diameter which are disposed around the sun roller 3.

The planetary rollers 4A, 4B, 4C are mounted rotatably through a pair of bearings 18 each on a planetary roller shaft 17a inserted and fixed in the speed reducer base 8. The planetary rollers 4A, 4B, 4C have the external forms thinned halfway of a circular cylinder each, that is, a character "H" turned 90° sideways, comprising first reduction parts 4Aa, 4Ba, 4Ca, second reduction parts 4Ab, 4Bb, 4Cb, auxiliary rollers 4Ac, 4Bc, 4Cc, auxiliary roller locking bolts 4Ad, 4Bd, 4Cd and positioning pins 4Ae, 4Be, 4Ce. The first reduction parts 4Aa, 4Ba, 4Ca and the auxiliary rollers 4Ac, 4Bc, 4Cc of the planetary rollers 4A, 4B, 4C are cylindrical in shape with a smooth outer surface each, and linked coaxially through the second reduction parts 4Ab, 4Bb, 4Cb. The second reduction parts 4Ab, 4Bb, 4Cb are also circular cylindrical in shape likewise with a smooth outer surface each, and are further coaxial with the first reduction parts 4Aa, 4Ba, 4Ca. The auxiliary rollers 4Ac, 4Bc, 4Cc on an upper portion of each planetary roller are assembled detachably by the locking bolts 4Ad, 4Bd, 4Cd and the positioning pins 4Ae, 4Be, 4Ce, and are ready for setting an output shaft 5, a pre-pressure ring 6, a pre-pressure flange 7a by a spacer 7b, and a bolt 7c.

A turning force of the sun roller 3 is transferred to the first reduction parts 4Aa, 4Ba, 4Ca of the planetary rollers 4A, 4B, 4C and the second reduction parts 4Ab, 4Bb, 4Cb integrated therewith, and further to the output shaft 5 which is an outer ring. The output shaft 5 comprises an upper portion 5d and a lower portion 5c linked by screws, and is hollow cylindrical in shape as a whole. The lower portion 5c is fixed rotatably to the speed reducer base 8 through a bearing 19, a portion inside of the hollow cylinder is partly constricted inwardly to form a projection 5b, and its end surface 5a is tapered to open upward or a circular cone in shape. The prepressure ring 6 is set on the circular conical end surface 5a of the output shaft 5. The surface whereat the pre-pressure ring 6 comes in contact with the second reduction parts of the planetary rollers 4A, 4B, 4C is a smooth circular cylinder in shape, and the portion to come in contact with the end surface 5a of the output shaft 5 is formed to cope with the circular conical shape of the output shaft. Further, the pre-pressure ring 6 has a slitting 6a provided at one portion for easy application of pre-pressure (FIG. 5). Since a slip may arise on each contact portion to bring about an unevenness on a transfer torque, and power cannot be transferred stably simply from incorporating the sun roller 3, the planetary rollers 4Aa, 4Ba, 4Ca, and the output shaft 5, the pre-pressure ring 6 functions to transfer the power accurately by applying a prepressure.

The description then refers to a method of how to apply pre-pressures.

Figure 6:
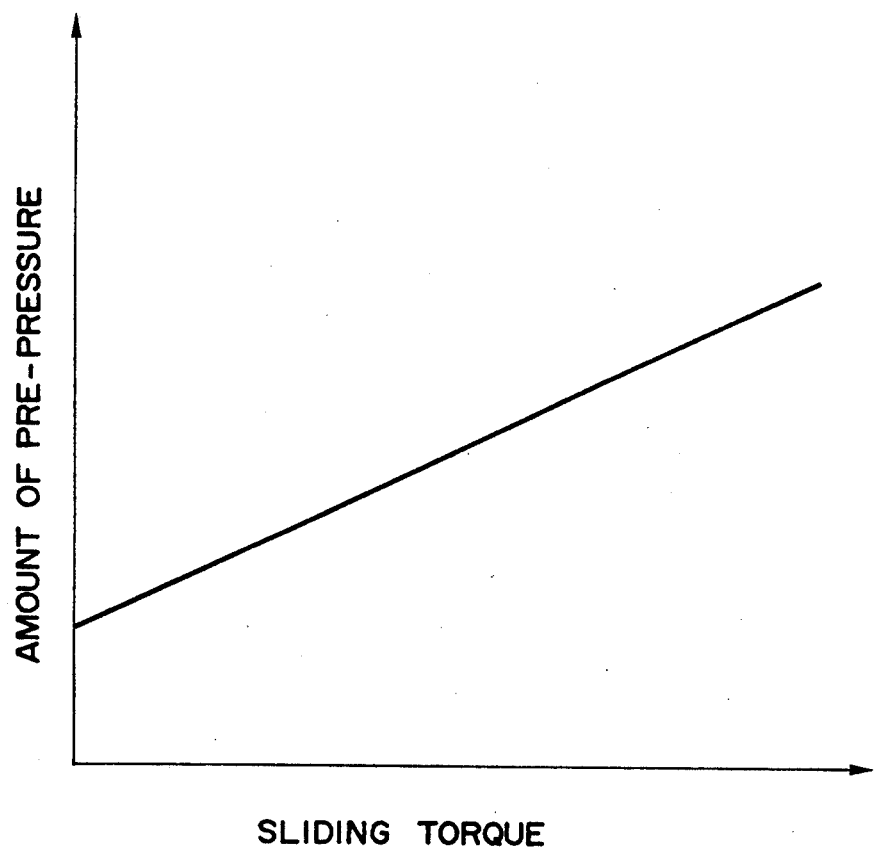

The planetary rollers 4A, 4B, 4C free from the sun roller 3 and the auxiliary rollers 4Ac, 4Bc, 4Cc are assembled to the speed reducer base 8 tentatively as described above. In such state the output shaft 5, the pre-pressure ring 6, the pre-pressure flange 7a and the spacer 7b are placed tentatively by the bolt 7c. Next the auxiliary rollers 4Ac, 4Bc, 4Cc of the planetary rollers are incorporated, placed in position, and then fixed by the locking bolts 4Ad, 4Bd, 4Cd. A desired pre-pressure will be applied by clamping the bolt 7c for the annular pre-pressure flange. In this case, from clamping the bolt 7c as turning the output shaft 5, a force can be applied uniformly to the pre-pressure ring 6, and further the bolt 7C behind the auxiliary rollers 4Ac, 4Bc, 4Cc can also be clamped securely. Then, from measuring an amount of pre-pressure and a value of sliding torque beforehand as shown in FIG. 6, the spacer 7b thick enough to generate a torque necessary for stable driving can be prepared, thus obtaining a proper torque.

The pedestal comprises a plurality of columns 9 having one end fixed to the speed reducer base 8 and rising among the planetary rollers 4A, 4B, 4C, and a support plate 10 having a projection on an axis of rotation of the output shaft 5 and fixed detachably to each column 9, and further the support plate 10 comprises an upper portion 10a and a lower portion 10b linked detachably by screws. An encoder 12 has an input shaft 12a provided on the upper portion 10a of the support plate 10, linked to the projection coaxial with the output shaft 5 through a coupling 11, and a body is fixed to the output shaft 5 through coupling members 12b, 12c linked by screws. The coupling member 12c and the output shaft 5 are demountable by screws.

Described next is an operation of the planetary roller speed reducer used in the embodiment of FIG. 1.

When the motor 1 starts up and the output shaft 1a runs, the sun roller 3 linked to the output shaft 1a by the coupling 2 also rotates at a rotational frequency the same as that of the output shaft 1a. Accordingly as the sun roller 3 rotates, the planetary rollers 4A, 4B, 4C kept in contact therewith are rotated by a frictional force. Since diameters of the first reduction parts 4Aa, 4Ba, 4Ca of the planetary rollers 4A, 4B, 4C in contact with the sun roller 3 and the auxiliary rollers 4Ac, 4Bc, 4Cc are larger than the diameter of the sun roller 3, the planetary rollers 4A, 4B, 4C are decelerated to run slower than the sun roller 3.

The output shaft 5 rotates to obtain a driving force on friction from the second reduction parts 4Ab, 4Bb, 4Cb through the pre-pressure ring 6 lying between the end surface 5a of the projection 5b and the second reduction parts 4Ab, 4Bb, 4Cb of the planetary rollers 4A, 4B, 4C. A substantial inside diameter of the output shaft 5 driven by the second reduction parts 4Ab, 4Bb, 4Cb smaller in diameter than the first reduction parts 4A$a$, 4B$a$, 4C$a$ through the pre-pressure ring 6 is larger than the diameter of the second reduction parts 4A$b$, 4B$b$, 4C$b$, therefore the output shaft 5 is further decelerated.

If a diameter of the sun roller 3 is $d_1$, a diameter of the first reduction parts 4A$a$, 4B$a$, 4C$a$ of the planetary rollers is $d_2$, a diameter of the second reduction parts 4A$b$, 4B$b$, 4C$b$ of the planetary rollers is $d_3$, and a substantial inside diameter of the output shaft 5 is $d_4$, then the reduction ratio will be obtained through Eq. (1).

$$\text{Reduction ratio} = \frac{d_2 \cdot d_4}{d_1 \cdot d_3} \quad (1)$$

When the output shaft 5 rotates, since a body of the rotary encoder 12 is fixed to the output shaft 5 by the coupling members 12$b$, 12$c$, the rotary encoder 12 rotates along with the output shaft 5. On the other hand, the input shaft 12$a$ of the rotary encoder 12 is linked to a projection of the upper portion 10$b$ of the support plate 10 by the coupling 11, therefore it does not rotate. Accordingly, the rotary encoder 12 comes to detect a turning angle between the support plate 10 of the pedestal and the output shaft 5. The projection of the upper portion 10$b$ of the support plate 10 and the input shaft 12$a$ of the rotary encoder 12 are disposed on a rotation axis of the output shaft 5, therefore nothing will obstruct rotation of the output shaft 5.

The planetary roller speed reducer used for the embodiment is constructed to detect a turning angle of the output shaft 5 directly on the rotary encoder, therefore a transfer error of the turning angle due to slip and others of a transfer route from the motor 1 to the output shaft 5 is negligible. The particular construction is available for controlling a high precision robot arm positioning simply from improving the rotary encoder to high precision, and further from using the planetary roller speed reducer, since a transfer torque is uniformly transmitted to a plurality of rollers roller surface pressure can be lowered and the lifetime of the speed reduce can be prolonged. Further, from forming the planetary rollers in two stages, a high reduction ratio is obtainable without enlarging an outside diameter of the speed reducer, and a load inertia applied to the motor is minimized.

In the planetary roller speed reducer used for the above-described embodiment, the rotary encoder 12 with the input shaft 12$a$ fixed to the support plate 10 is employed. However, the rotary encoder may be mounted on the support plate 10 side, or such construction is conceivable otherwise that a plurality of passive reflectors corresponding to the slit disk such as encoder or the like are disposed on the support plate 10, a light emitting element and a light receiving element are disposed on the output shaft, the light from the light emitting element which is reflected on the passive reflectors is received by the light receiving element, thus detecting turning angles in the mode of indirect contact.

Figure 7:
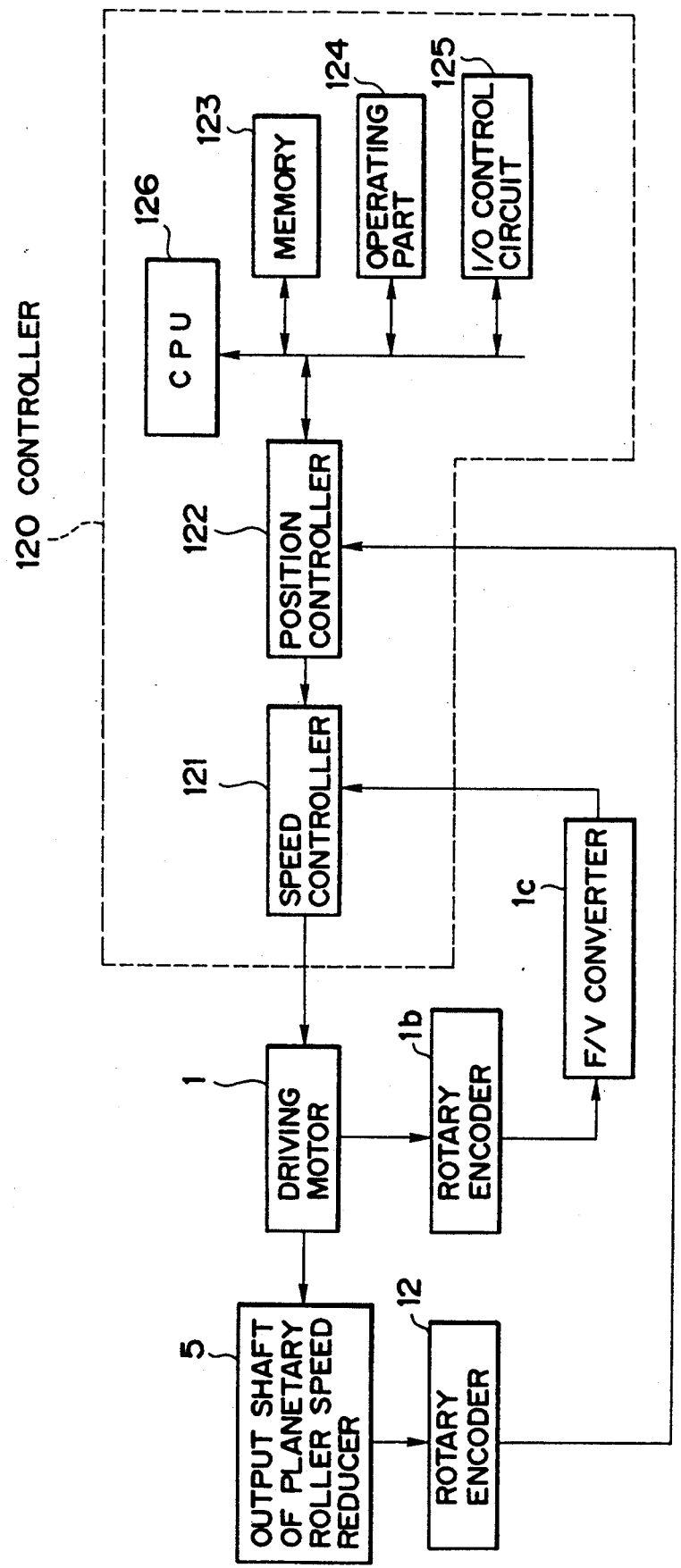

Next, a control system of the embodiment given in FIG. 1 will be described with reference to FIG. 7.

A controller 120 comprises a speed controller 121, a position controller 122, a memory 123, an operating part 124, an I/O control circuit 125 and a CPU 126, outputting commands to the driving motor 1 so as to control the output shaft 5 of the planetary roller speed reducer to which a robot arm 13 is linked. The output shaft 5 is driven by the motor 1 in accordance with the command, a speed data is fed back to the speed controller 121 from the motor 1 through a rotary encoder 1$b$ and an F/V converter 1$c$, and a position data is fed back to the position controller 122 from the output shaft 5 through the rotary encoder 12. Accordingly, the control system is a perfect closed loop with reference to a position loop, and thus if a slip arises in a driving force transfer route from the motor 1 to the output shaft 5, a rotational position of the output shaft 5 can be controlled accurately without being influenced totally by the slip. In this connection, a position of the output shaft 5 may definitely be controlled by using a known numerical control means, and the output shaft to which the robot arm is linked may be rotated precisely simply by improving the rotary encoder 12 to high precision.

Next, the description will refer to an in-use example of the first embodiment of the present invention.

Figure 8:
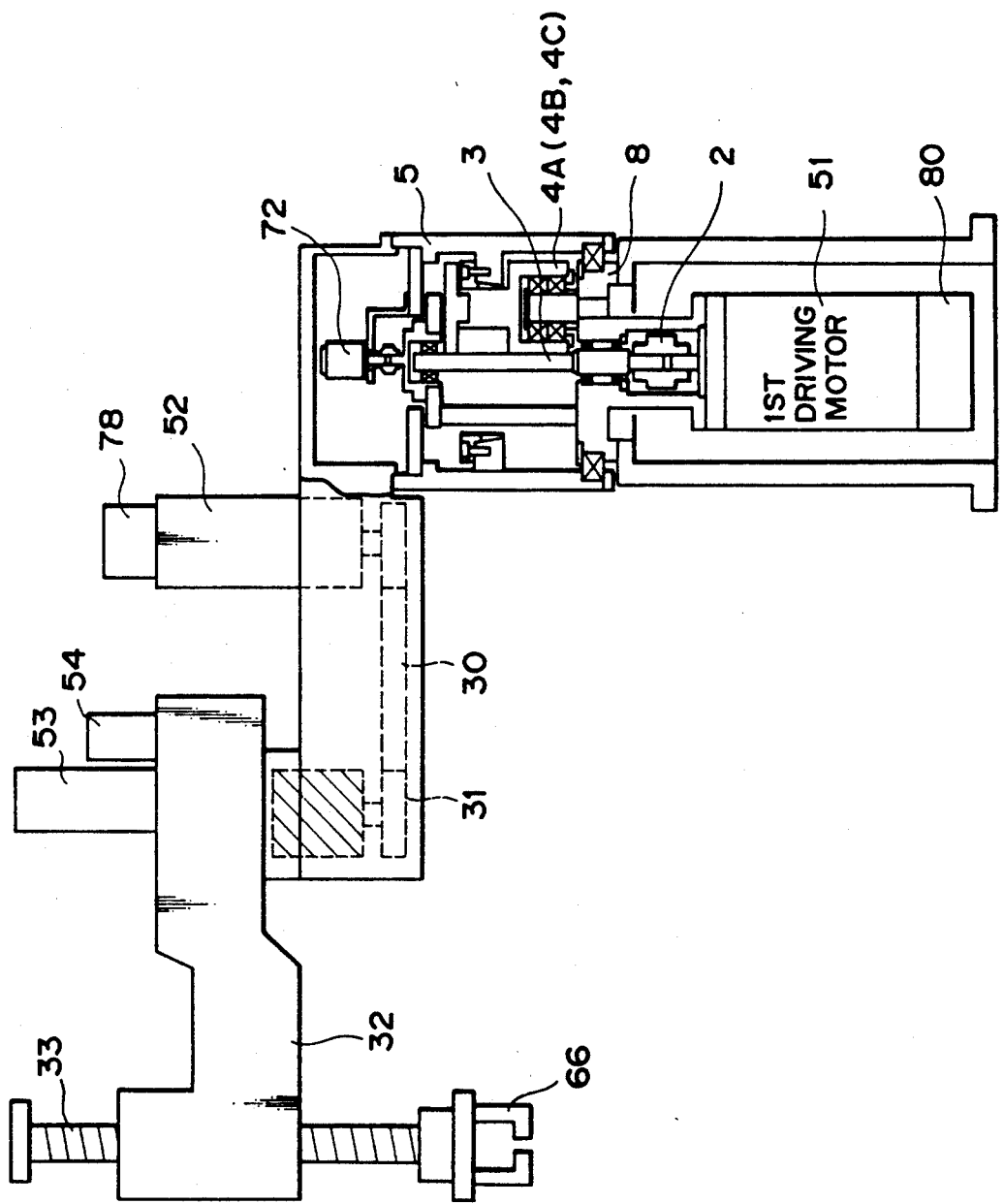
Figure 9:
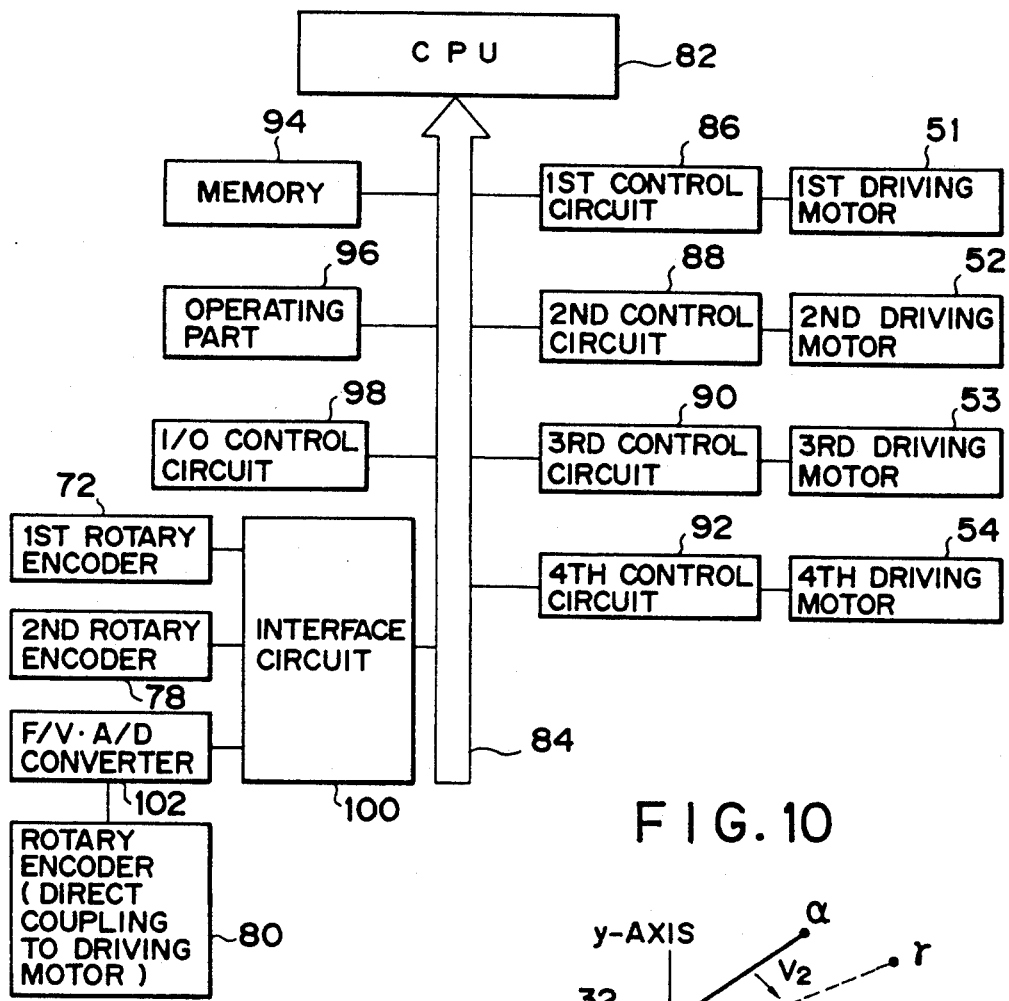
Figure 10:
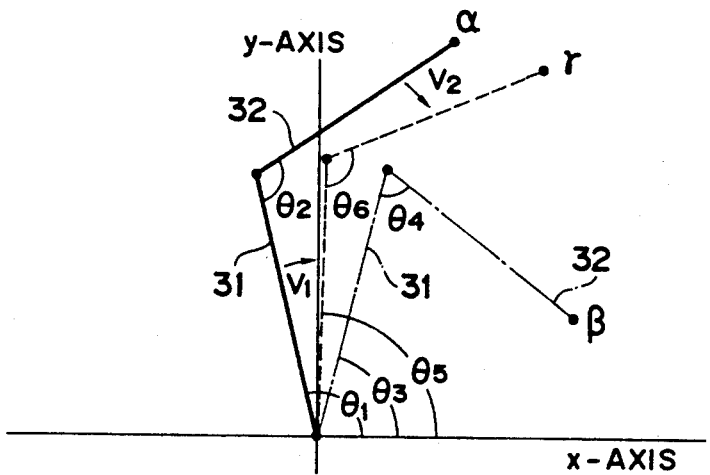
Figure 11:
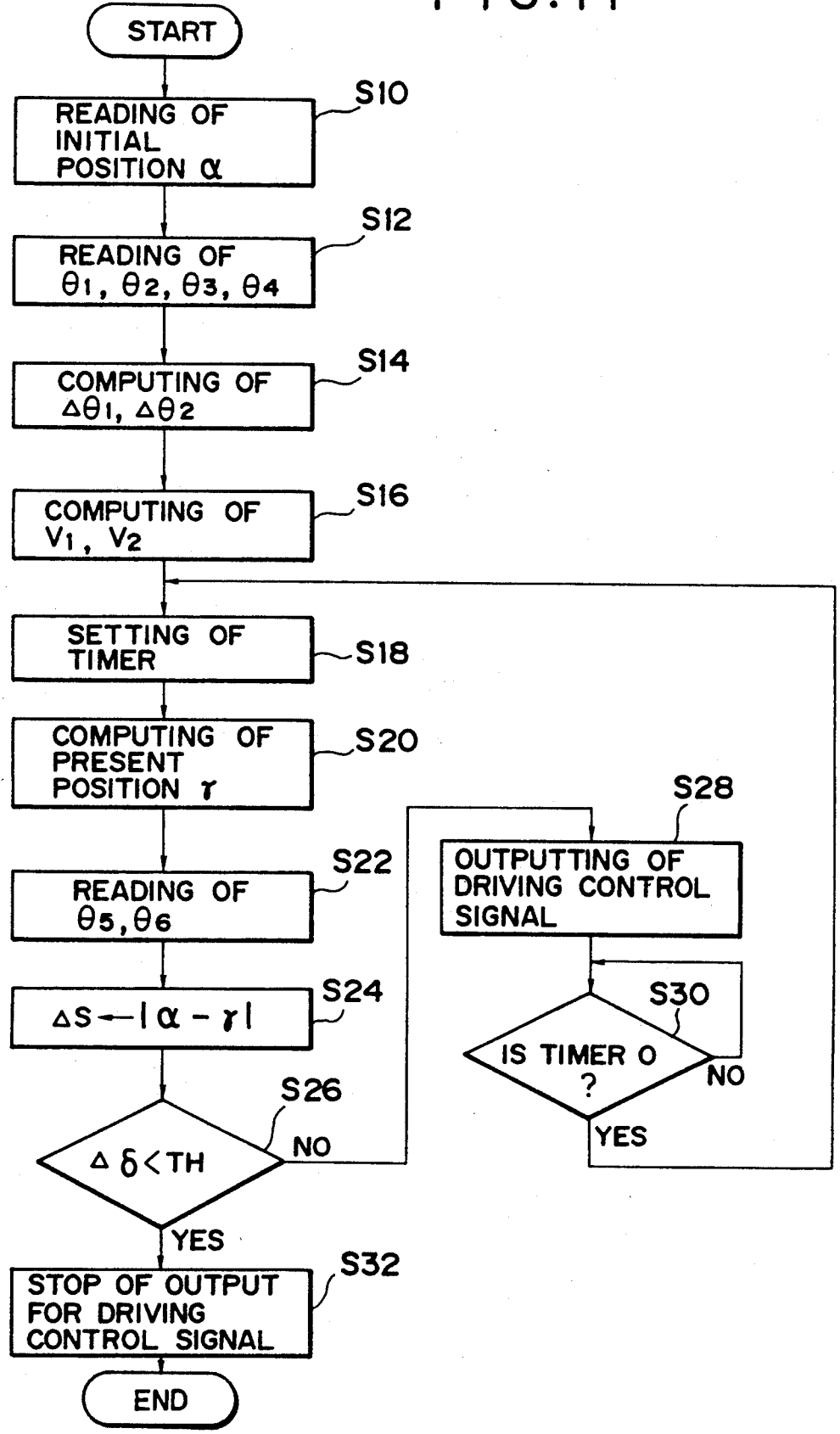

FIG. 8 is a structural drawing representing a multi-articulated robot for which a plural planetary roller speed reducer is employed, FIG. 9 is a block diagram showing a control system of the embodiment given in FIG. 8, FIG. 10 is a drawing showing each parameter used for the control system of FIG. 9, and FIG. 11 is a flowchart showing a control content of the control system given in FIG. 9.

The control system of the multi-articulated robot is provided with a CPU 82 as a control unit. Connected to the CPU 82 through a bus line 84 are a first control circuit 86 for controlling a rotational drive of a first horizontal arm 31, a second control circuit 88 for controlling a rotational drive of a second horizontal arm 32, a third control circuit 90 for controlling a vertical drive of a vertical arm 33, and a fourth control circuit 92 for controlling a rotational drive of the vertical arm 33. Here, the first control circuit 86 is connected to a first driving motor 51, the second control circuit 88 is connected to a second driving motor 52, and the third and fourth control circuits 90, 92 are connected to third and fourth driving motors 53, 54 respectively.

Further connected to the CPU 82 through the same bus line 84 are a memory 94 as storage means, an operating part 96 for designating a control action to the CPU 82, and an I/0 control circuit 98 for controlling incoming and outgoing of signals. Further, an interface circuit 100 is connected to the CPU 82 through the same bus line 84, first and second rotary encoders 72, 78 are connected to the interface circuit 100, and also a rotary encoder 80 is connected thereto through an F/V.A/D converter 102.

Here, in the control system where, for example, a finger device 66 (FIG. 8) is shifted, as indicated in FIG. 10, from an initial position indicated by a symbol $\alpha$ to an object position indicated by a symbol $\beta$, an arrangement is such that a control action will be carried out according to a flowchart shown in FIG. 11. Then, in the state where the finger device 66 lies at the initial position $\alpha$, let it be assumed that the x-axis functioning as a reference axis and the first horizontal arm 31 form an angle $\theta_1$, and the first horizontal arm 31 and the second horizontal arm 32 form an angle $\theta_2$. Further, in the state where the finger device 66 lies at the object position 8, let it be assumed that the x-axis and the first horizontal arm 31 form an angle $\theta_3$, and the first horizontal arm 31 and the second horizontal arm 32 form an angle $\theta_4$.

Figure 12:
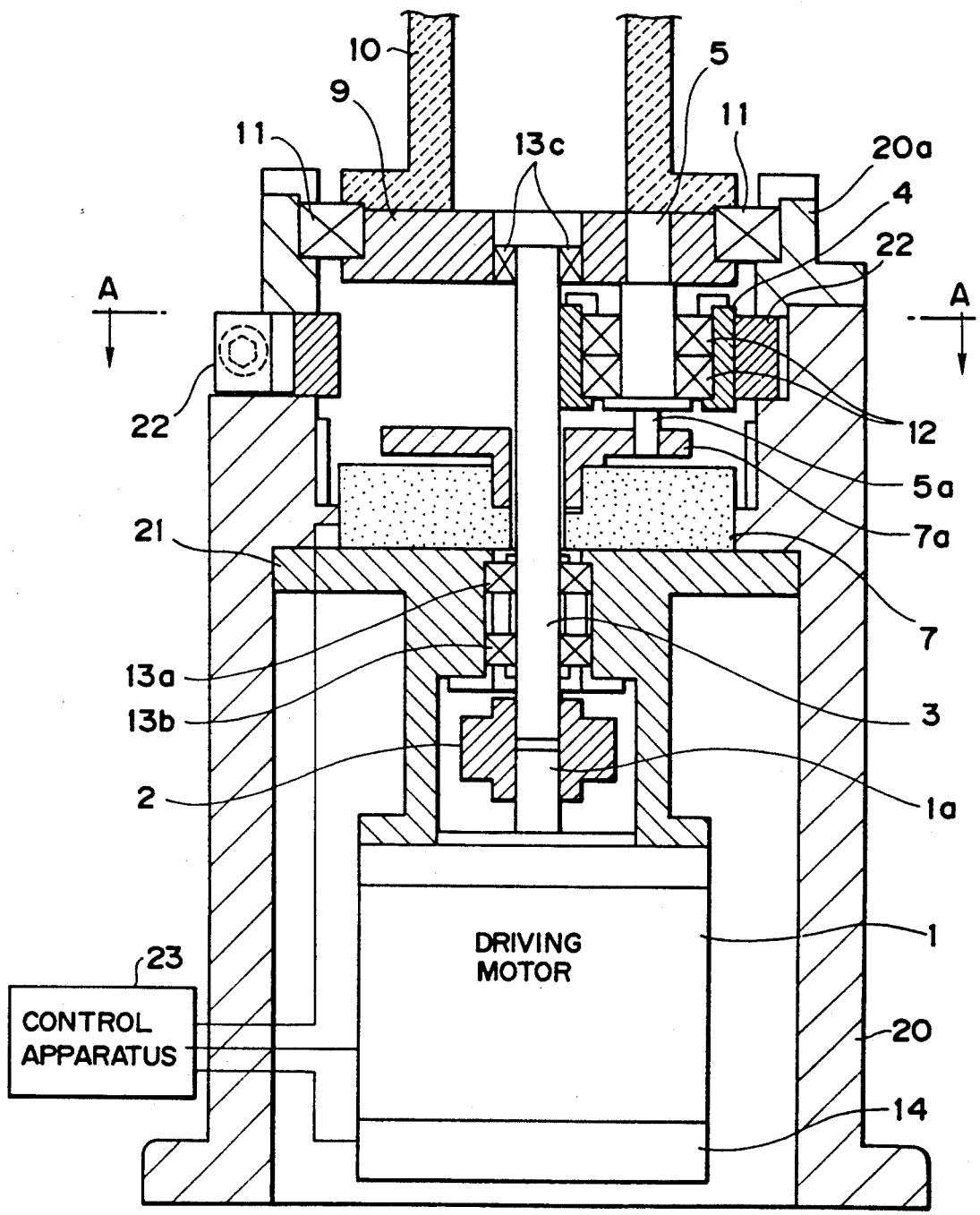

Under such condition, the control system carries out a control action in the procedure shown in FIG. 12. That is, when the control procedure starts, the initial position α and the object position β, inputted through the operating part 96 are read in step S10. Then in step S12, the angle data $\theta_1$, $\theta_2$, $\theta_3$, $\theta_4$ of the first and second horizontal arms 31, 32 at the initial position α and the object position β are read according to the initial position α and the object position β and the correlation stored in the memory 94 beforehand. Then in step S14, a necessary shift angle $\Delta\theta_1 (=\theta_1 - \theta_3)$ of the first horizontal arm 31 and a necessary shift angle $\Delta\theta_2 (=\theta_2-\theta_4)$ of the second horizontal arm 32 are calculated. Then in step S16, turning velocities $v_1$, $v_2$ of the first and second horizontal arms 31, 32 are calculated according to a calculation result obtained in step S14 so that operations of the first and second horizontal arms 31, 32 will come to an end at the same time.

In step S18 thereafter, a time 5 msec is set on a timer (down counter). Then in step S20, a present position γ of the finger device is calculated. The calculation is performed according to detection results from the first rotary encoder 72 connected to the output shaft driven by the first driving motor 51 and the second rotary encoder 78 connected to the second driving motor 52. Then, in step S22, angles $\theta_5$, $\theta_6$ of the first and second horizontal arms 31, 32 necessary for coming to the present position γ are read according to the calculated present position γ through the memory 94.

In this connection, the angles $\theta_5$, $\theta_6$ are defined as a present value hereinafter. Further, the angles $\theta_3$, $\theta_4$ are defined as a desired value hereinafter. At the time when step S20 is carried out at first in 20 the control procedure, the initial position α and the present position γ coincide with each other.

In step S24 thereafter, a deviation ΔS is calculated from an absolute value of the difference between the desired value and the present value. Then, 25 in step S26, whether or not the deviation ΔS is less than a predetermined threshold TH is discriminated. When decided NO in step S26, that is, when the present value is decided not to come within a tolerance where it falls on the desired value expressed by the threshold TH, a driving control signal is outputted to the first and second driving motors 51, 52 in step S28 according to the aforementioned turning velocities $v_1$, $v_2$ calculated in step S16.

In step S30 thereafter, whether or not the timer has come to zero is discriminated. When decided NO in step S30, that is, when it is decided that the timer has not yet come to zero, step S30 is executed repeatedly. Then in step S30, when decided YES, that is, it is decided that the timer has come to zero, the procedure goes forward to the aforementioned step S18, the time 5 msec is again set on the timer, and the aforementioned procedure is repeated.

On the other hand, in the aforementioned step S26, when decided YES, that is, when it is decided that the deviation ΔS becomes less than the threshold TH and comes within a tolerance of the desired value, the procedure goes forward to step S32, where the driving control signal is stopped from outgoing, and a series of control procedure is closed.

As described above, the present invention comprises driving a robot arm which is coupled to an outer ring of the planetary roller speed reducer provided with the planetary rollers in a two-stage construction, and the turning angle detection means capable of detecting directly a turning angle of the outer ring or an output shaft, thereby controlling the robot arm accurately.

According now to the present invention, with the large-diametral portions 4Aa (4Ba, 4Ca) in contact with the sun roller, and the small-diametral portions 4Ab (4Bb, 4Cb) in contact with the output shaft 5, the planetary rollers 4A, 4B, 4C coming to press the sun roller 3 construct a reduction mechanism from having the prepressure ring (pressing ring) 6 placed between the small-diametral portions and the output shaft, pressing is adjusted by forming one side of the prepressure ring 6 into the tapered surface 5a, and from mounting the auxiliary rollers 4Ac, 4Bc, 4Cc on the planetary rollers each, a rotational stability of the sun roller is ready for compensating, further from constructing the auxiliary rollers detachably, a pressing at small-diametral portions of the planetary rollers is made easy for adjustment, and a rotary driving system with a large reduction ratio is realizable.

FIG. 12 to FIG. 15 represent a second embodiment of the present invention. The embodiment is characterized by a construction wherein the planetary rollers coming to press the sun roller revolve round the sun roller as rotating on the axes, thus proposing a rotary driving system with a large reduction ratio of the motor and the output shaft.

Further, from using the rotary driving system with a large reduction ratio for driving robot arms, a robot small in motor torque but large in arm torque is proposed.

In FIG. 12 to FIG. 15, like members are identified by the same reference characters in FIG. 1 to FIG. 5.

FIG. 12 is a sectional view representing an example of a planetary roller speed reducer of the present embodiment, FIG. 13A and FIG. 13B are sectional views taken on lines A—A and B—B of FIG. 12 respectively, showing an outer ring of the example thereof.

A motor fitting flange 21 is mounted on a speed reducer ground way 20 or a pedestal. The driving motor 1 (hereinafter referred to as motor 1) is mounted on the motor fitting flange 21, and rotational speed of the motor 1 is detected by the motor-coupled encoder 14 and so outputted.

The sun roller 3 is circular cylindrical in shape with a smooth surface, linked to the output shaft 1a of the motor 1 by the coupling 2, and is also journaled rotatably in the motor fitting flange 21 through a pair of bearings 13a, 13b. A plurality of planetary rollers which will be described hereinlater circumscribe an outer periphery on its extension, and the terminal ends are journaled further by a bearing 13c so as to keep the sun roller 3 from whirling. A turning force of the sun roller 3 is transferred by a frictional force of the planetary rollers 4 of a diameter which are disposed plurally to circumscribe a circumference of the sun roller 3. The planetary rollers 4 are journaled each in the shaft 5 fixed to the output flanges 9 through a pair of bearings 12. Each shaft 5 is also extended toward the output shaft 1a of the sun roller 3 and its lower end 5a is connected to the encoder fitting flange 7a. Each planetary roller 4 is circular cylindrical in shape with a smooth surface, and inscribes an outer ring 22 within the casing.

Here, the outer ring (pre-pressure ring) 22 which is a pre-pressure regulating mechanism will be described with reference to FIG. 13A and FIG. 13B. The outer ring 22 comprises an external wall portion 22a which is cylindrical in shape, a slitting portion 22b running slantwise through the external wall portion 22a, brackets 22c, 22d welded to the external wall each across the slitting portion 22b, and a bolt 22f and a nut 22g passing through holes provided in the brackets 22c, 22d and clamping the brackets 22c, 22d so as to allow them to come near each other through a spring 22e.

A retaining part 20a is fixed to the speed reducer ground way 20, retaining the bearing 11 and also the external wall portion 22a of the outer ring 22. A retaining force of the external wall portion 22a by the speed reducer ground way 20 and the retaining part 20a is adjusted so that the outer ring 22 will not rotate even at the time when the planetary rollers 4 are driven but is contractible against a compressive force of the spring 22e. Needless to say, it is apparent that a plurality of elongated apertures are formed radially on the external wall portion 22a, a pin capable of sliding the elongated apertures is provided on the speed reducer ground way 20, thereby keeping it free from depending on a retaining force by the retaining part 20a.

A reduction ratio of the planetary roller speed reducer of the present embodiment is expressed by Eq. (2) where a diameter of the sun roller is $d_1$, and an inside diameter of the outer ring is $d_2$.

$$\text{Reduction ratio} = \frac{d_1}{d_2} + 1 \qquad (2)$$

That is, when the motor 1 runs, the sun roller 3 rotates, and each planetary roller 4 rotates accordingly thereto. However, since the outer ring 22 is locked by the retaining part 20a, it cannot be rotated, and hence each planetary roller 4 revolves round the sun roller as rotating on its axis. The phenomenon is peculiar to the planetary roller speed reducer, and the reduction ratio can be taken larger by +1 than in the case where a speed reduction is realized simply by the sun roller and the outer ring.

The output shaft 10 is coupled to the output flange 9 and mounted rotatably on the retaining part 20a together with the output flange 9 through the bearing 11. Accordingly, a decelerated output is transferred to the output shaft 10 to drive the robot arm 15 (FIG. 15), for example, which is connected to the output shaft 10 and others. On the other hand, a turning angle of the speed reducer ground way 20 and the output shaft 10 is detected by a hollow shaft type encoder 7 or turning angle detection means which is driven through the encoder fitting flange 7a connected to the lower end 5a of the shaft 5. Further, the motor 1, the motor-coupled encoder 14 and the hollow shaft type encoder 7 are connected to a control apparatus 23 and controlled thereby.

In the present embodiment, an amount of prepressure (amount of compression ( of the spring 17) and a value of sliding torque will be measured beforehand, as shown in FIG. 6 for compressive force of the spring, thereby setting a pre-pressure ensuring a necessary torque.

Then, in case each planetary roller 4 has worn out for a long-term service, while a diameter of each planetary roller 4 gets small, it operates in the direction where an inside diameter of the outer ring 22 is contracted by the spring 22e, therefore the pre-pressure does not change substantially, and power may be transferred in a steady state.

Practically, an amount of wear of the planetary roller is very small at several 10 μm, therefore an amount of automatic control by the spring 22e is infinitesimal.

Figure 14:
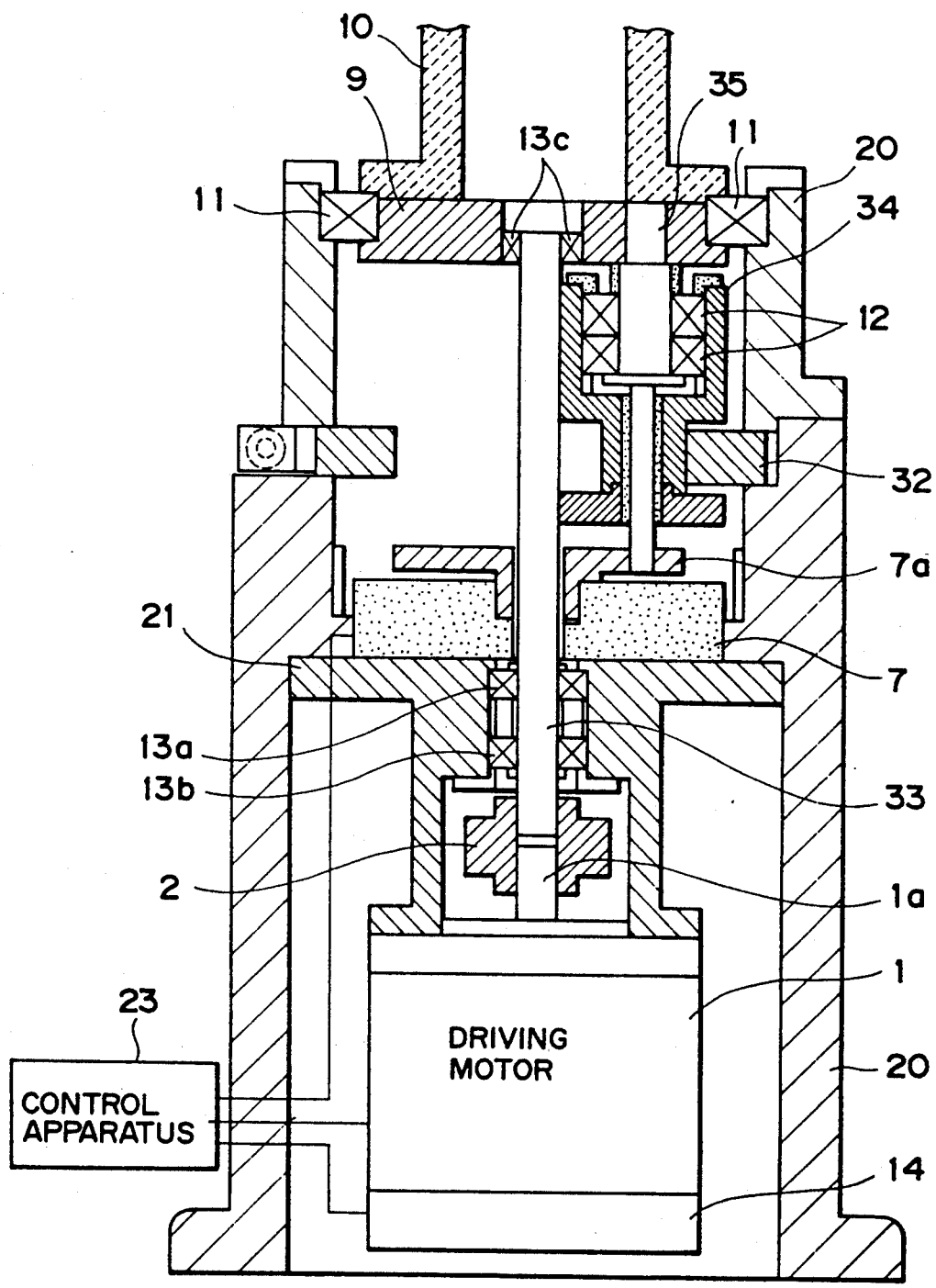
Figure 15:
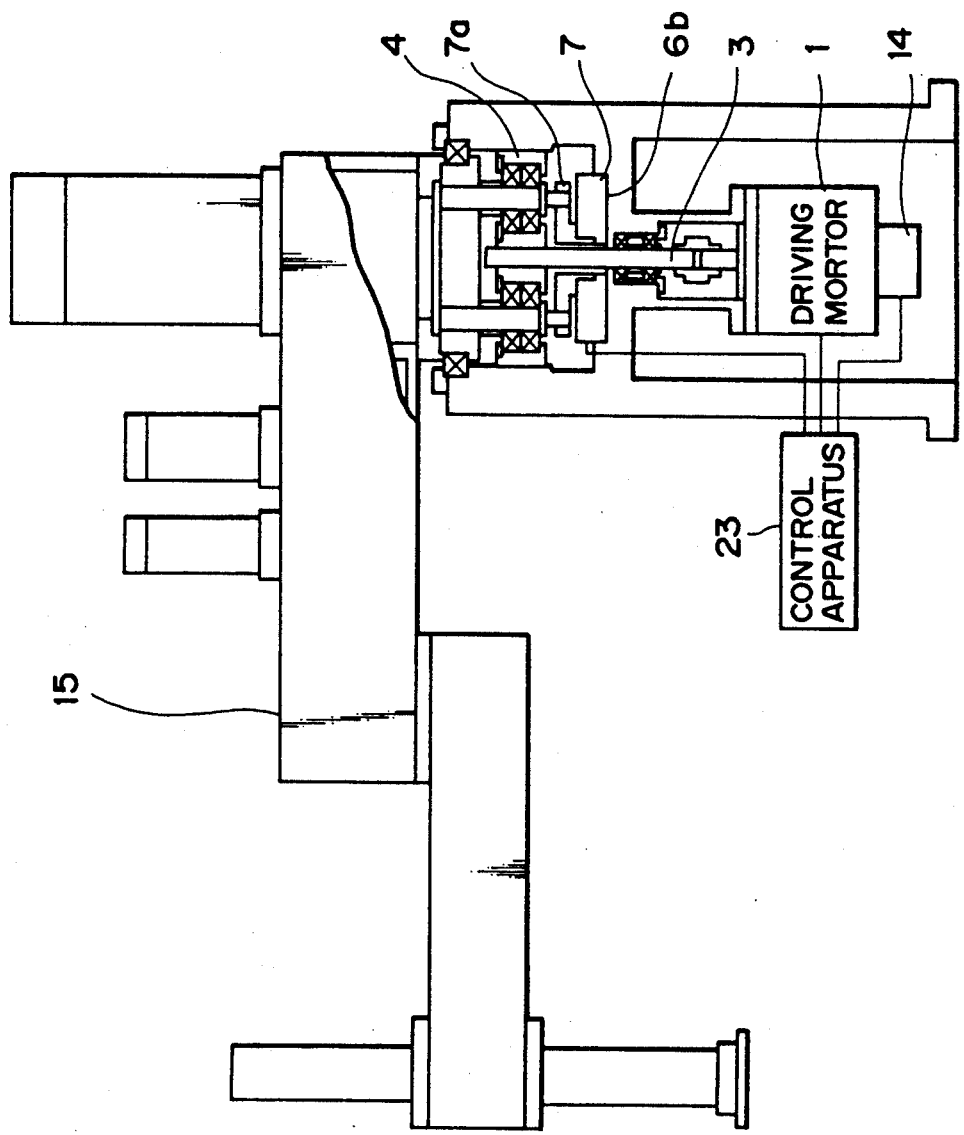

FIG. 14 is a sectional view representing another embodiment of the present invention.

As compared with the embodiment given in FIG. 12, a planetary roller 34 has a diameter of the central portion narrowed as compared with opposite ends, which is characteristic of the present embodiment. The planetary roller 34 has the opposite ends with a large diameter circumscribed by the sun roller 33 and the central portion with a small diameter inscribed by the outer ring 32. A revolution of the planetary roller is transferred to the output shaft through the output flange 9 with a shaft 35 mounted thereon. The outer ring 32 has a shape almost similar to the outer ring 22 of the embodiment given in FIG. 12 barring the diameter, and is retained between the speed reducer ground way 20 and a retaining part 20b.

Figure 13:
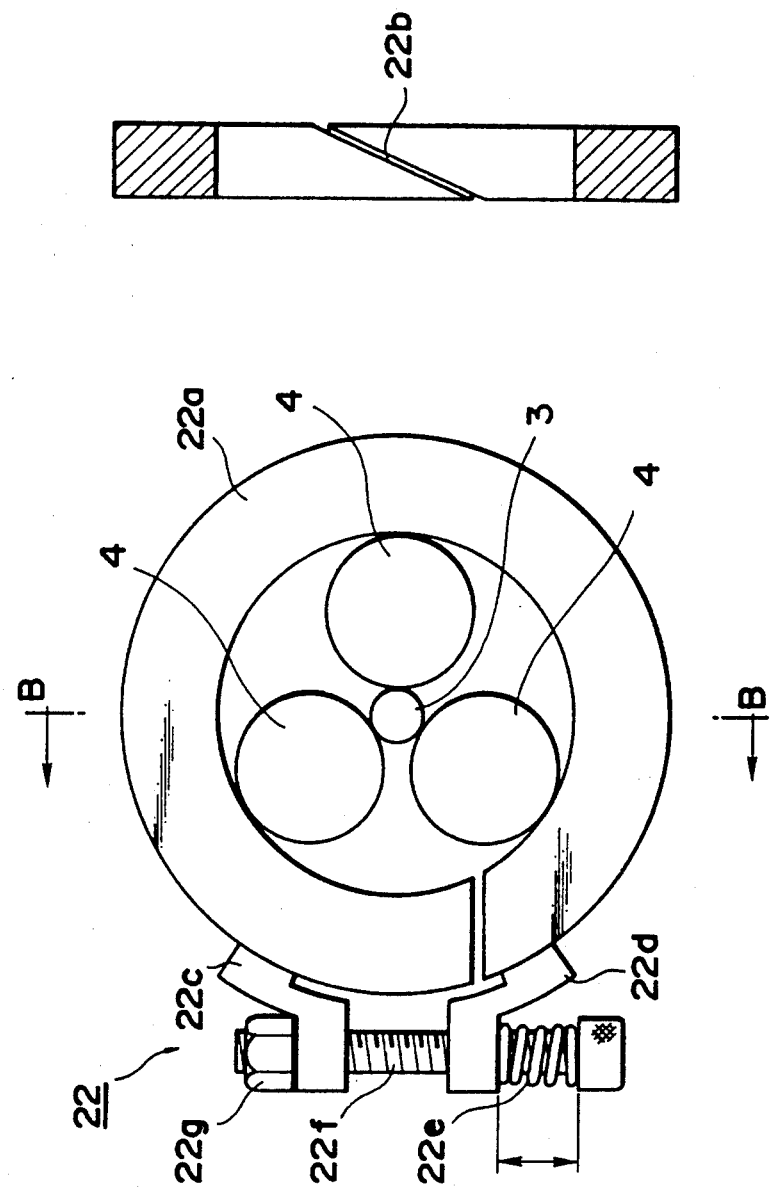

A pre-pressure action of the outer ring 32 is similar to that of the example of FIG. 13, therefore a further description is omitted here.

As described above, an inside diameter of the outer ring is contractible according to the present invention, therefore if the planetary roller has worn out, a pre-pressure is corrected automatically, therefore a stable driving force can be transferred.

According to the present invention, a reduction ratio can be increased as described hereinabove, therefore a robot with a large arm driving torque is obtainable from using a motor with small torque, thus providing a rotary driving system preferable for use on robots operating for the work on a large work load or tool load.

Figure 16:
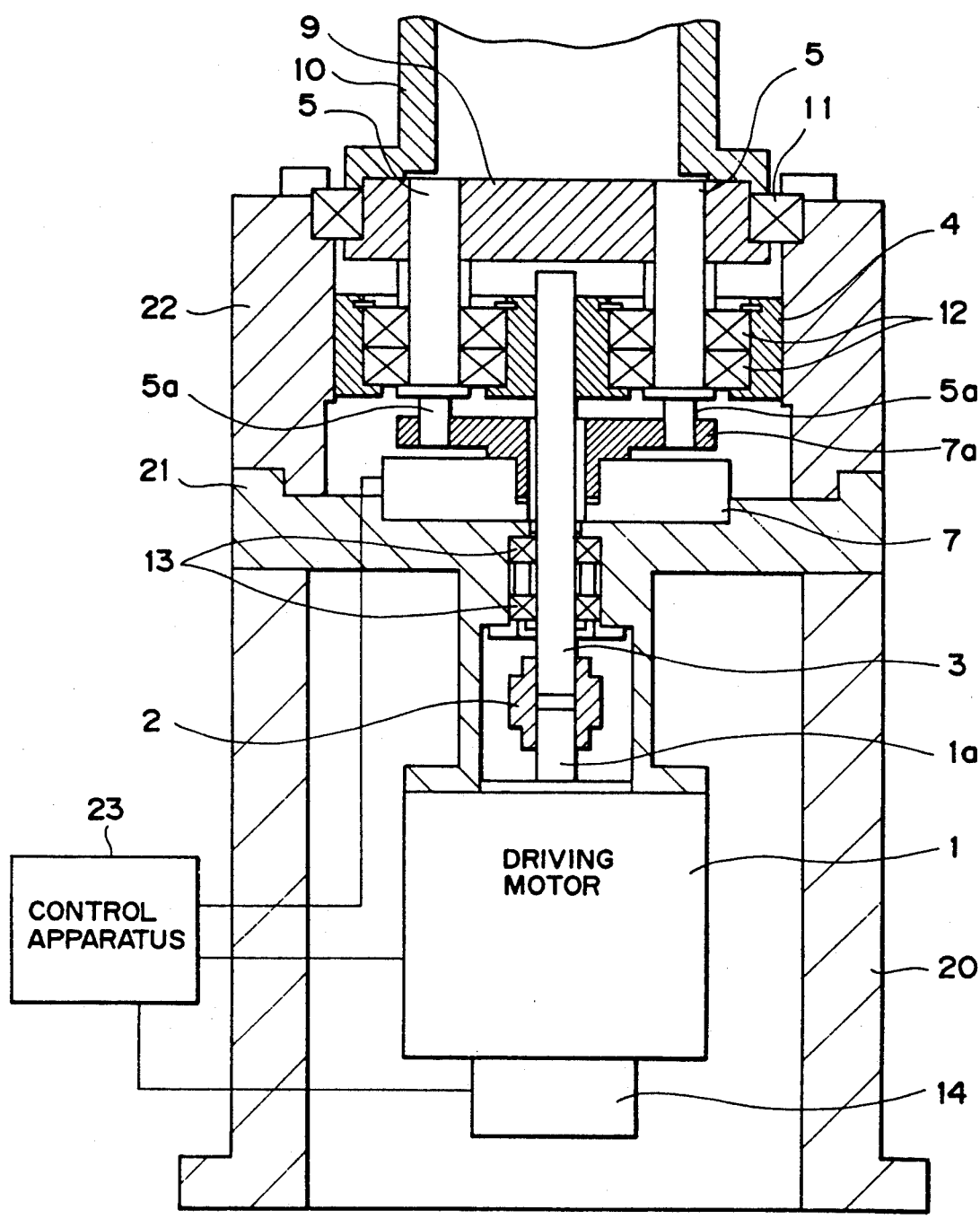
Figure 17:
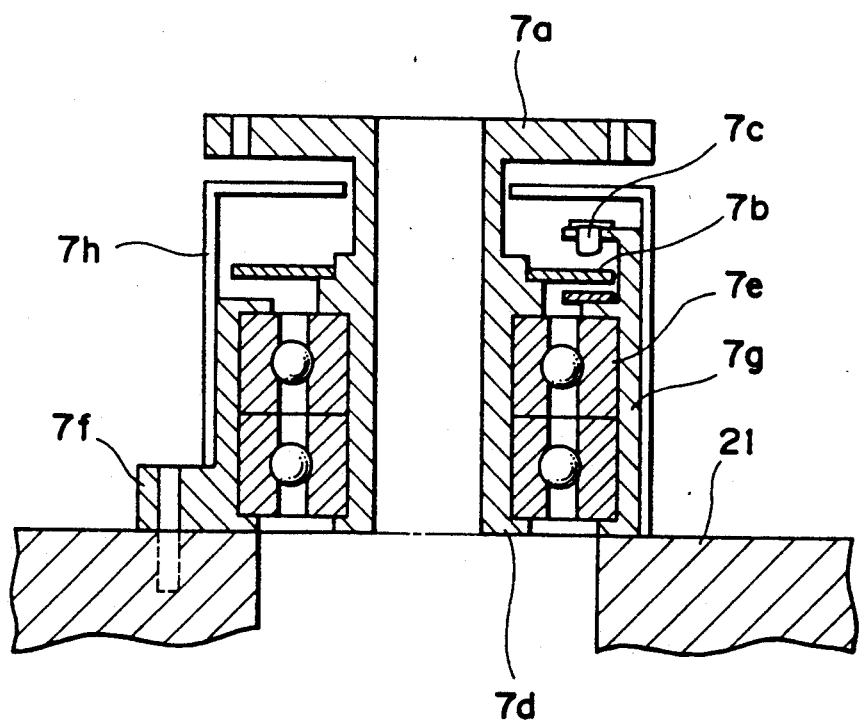

FIG. 16 and FIG. 17 exemplify the case where a hollow type turning position detector is applied to the rotary driving system of the present invention. In FIGS. 16 and 17, like reference characters represent like members in FIG. 12.

The motor fitting flange 21 and the outer ring 22 are mounted on the speed reducer ground way 20 working as a pedestal. The driving motor 1 (hereinafter referred to as motor 1) is mounted on the motor fitting flange 21, and a rotational speed of the motor 1 is detected by the motor-coupled encoder 14 to outputting.

The sun roller 3 is cylindrical in shape with a smooth surface, linked to the output shaft 1a of the motor 1 by the coupling 2, journaled rotatably in the motor fitting flange 21 or a part of the casing through a pair of bearings 13, and a plurality of planetary rollers which will be described hereinlater are circumscribed to an outer periphery on its free end side so as to keep the sun roller 3 from whirling. A turning force of the sun roller 3 is transferred by a frictional force of the planetary rollers 4 of a diameter which are disposed plurally to circumscribe a circumference of the sun roller 3. The planetary rollers 4 are journaled rotatably each in the shaft fixed to the output flange 9 through a pair of bearings 12. Each shaft 5 is also extended to the output shaft 1a side of the sun roller 3 and has its lower end 5a connected to the encoder fitting flange 7a. Each planetary roller 4 is cylindrical in shape with a smooth surface, and inscribes the outer ring 22 within the casing.

A reduction ratio of the planetary roller speed reducer of the present embodiment will be expressed ) where a diameter of the sun roller is $d_1$, by Eq. (3) where a diameter of the sun roller is $d_1$, an inside diameter of the outer ring is $d_2$.

$$\text{Reduction ratio} = \frac{d_1}{d_2} + 1 \qquad (3)$$

That is, when the motor 1 runs, the sun roller rotates, and each planetary roller 4 rotates accordingly thereto. However, since the outer ring 22 is locked, it cannot be rotated, and hence each planetary roller 4 revolves around the sun roller as rotating on its axis. The phenomenon is peculiar to the planetary roller speed reducer, and the reduction ratio can be taken larger by +1 than in the case where a speed reduction is realized simply by the sun roller and the outer ring.

The output shaft 10 is coupled to the output flange 9 and mounted rotatably on the outer ring 22 together with the output flange 9 through the bearing 11. Accordingly, a decelerated output is transferred to the output shaft 10 to drive the robot arm, for example, which is connected to the output shaft 10 and others. On the other hand, a turning angle between the pedestal and the output shaft 10 is detected by the hollow shaft type encoder 7 or turning angle detection means which is driven through the encoder fitting flange 7a connected to the lower end fa of the shaft 5. The hollow shaft type encoder 7 comprises, as shown in FIG. 17, a fixed portion 7f, a slit plate 7b, an optical device 7c, a hollow shaft 7d, an encoder fitting flange 7a integrated with the hollow shaft 7d, a bearing 7e, a bearing housing 7g constructed partly of the fixed portion 7f, a cover 7h and others. The fixed portion 7f is fixed to the motor fitting flange 21, and further the optical device 7c is fixed to the fixed portion 7f. On the other hand, the hollow shaft 7d is integrated with the encoder fitting flange 7a, and journaled rotatably in the bearing housing 7g constituting a part of the fixed portion 7f with the cover 7h and the optical device 7c mounted thereon through a pair of bearings 7e. The slit plate 7b is fixed to the hollow shaft 7d, and is disposed between the optical device 7c and the fixed portion 7f. Accordingly, when the encoder fitting flange 7a is rotated by the planetary rollers 4, the rotation works to turn the slip plate 7b, which is detected by the optical device 7c to outputting.

The hollow shaft type encoder 7 is fittable between the output shaft 10 and the outer ring 22 however, since a diameter of the hollow shaft 7d of the hollow shaft type encoder 7 is φ30 to φ50 or so, the output shaft for transferring a large torque must be coordinated to φ30 to φ50 or so when it is intended for driving the robot arm 15 as shown in FIG. 3. Thus, what is problematical is that a material strength of the output shaft becomes insufficient (barring the case where a small torque is transferred). The sun roller 3 is a shaft connected to the motor 1 by way not of a reduction mechanism, therefore only a small transfer torque will suffice and the diameter is good therefor when it is φ20 to φ30 big. Now, therefore, the hollow shaft type encoder 7 is mounted on a connection side of the driving motor output shaft of the sun roller. Further, the motor 1, the motor-coupled encoder 14, and the hollow shaft type encoder 7 are connected to the control apparatus 23 and controlled thereby.

According to a construction of the present embodiment, a rotation center of the output shaft 10 and a rotation center of the hollow shaft type encoder for detecting turning angles can be made coaxial and thus rotations of the output shaft can be detected directly, therefore a feedback control system having a perfect closed loop can be constructed.

As described above, according to the present invention, the planetary rollers are made to rotate on the axes and revolve around, connected to the output shaft through the output flange, and from detecting a turning angle between the pedestal and the output shaft on the turning angle detection means, a position of the output shaft can be detected free from being influenced by a slip of the transfer mechanism, and quite different from a speed reducer operating on gears a backlash will not be produced any, thus the control system may realize a feedback system in a perfect closed loop, and hence an absolute positioning precision can be enhanced, further from effecting a detection of turning angles on the hollow shaft type encoder, an effect may be ensured such that the system can be made compact in structure as a whole.

Figure 18:
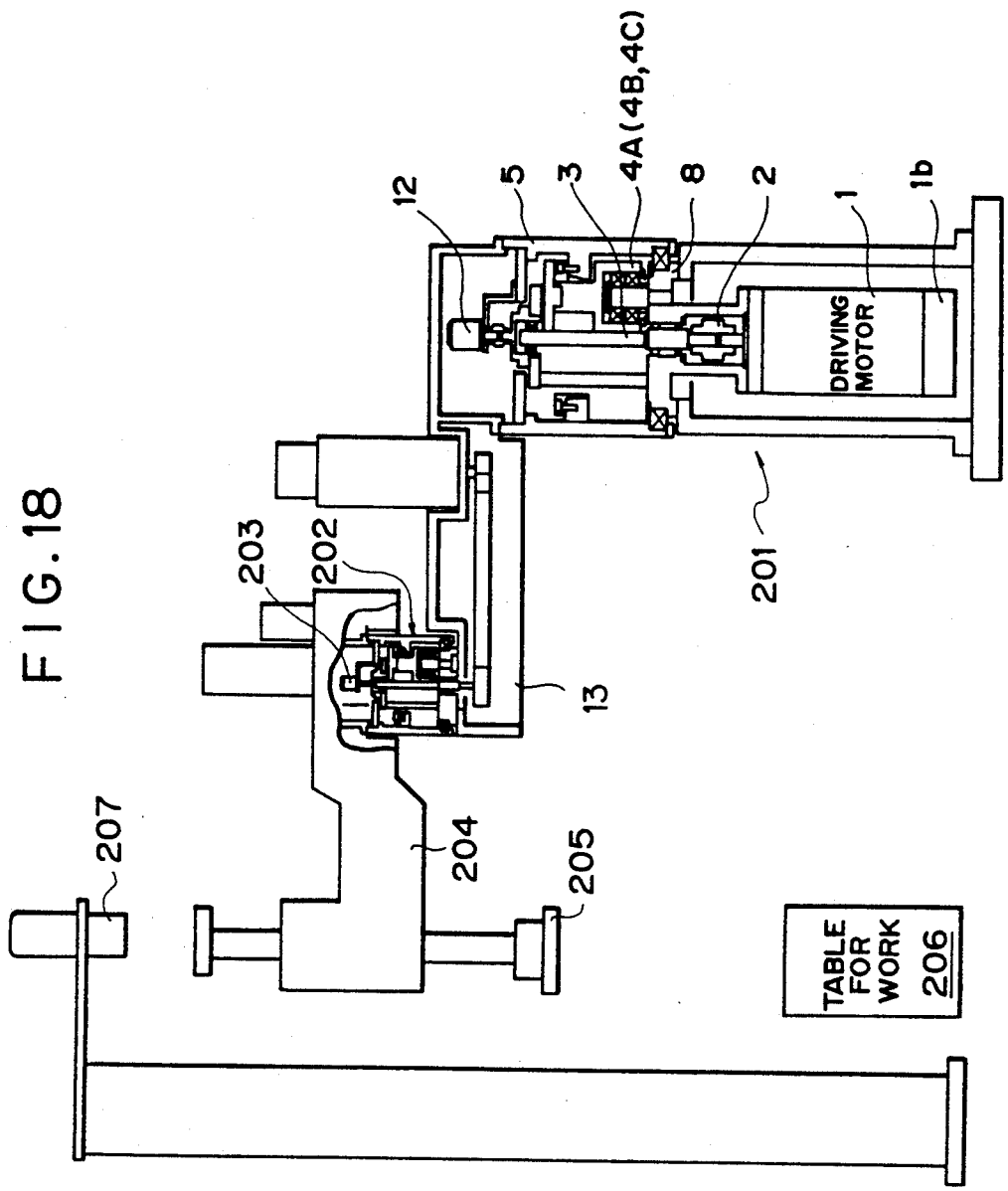
FIG. 18 is a structural drawing for illustrating an example of application according to the present invention, wherein a planetary roller speed reducer is incorporated in a robot.

FIG. 18 represents another application of the present invention, exemplifying the case where the planetary roller speed reducer of the present invention is incorporated in a robot of the system wherein the second arm 204 connected to the first arm 13 is decelerated by a second planetary roller speed reducer 202 built in the first arm 13, a work (not indicated) placed on a table 206 is observed visually by observing means such as CCD camera or the like.

The robot illustrated in FIG. 18 observes a position of the work on the table 206 visually by the observing means 207, stores position information in image processing means (not indicated), and when operating for holding the work by a finger (not indicated) mounted on a finger fitting member 205, a position of the second arm 204 can be controlled at high precision by a signal from a rotary encoder 203 in the second planetary roller speed reducer 202 for detecting a shift position of the second arm according to the position information stored as above.

Thus provided is a robot capable of shifting and controlling the finger precisely to the position observed visually by the observing means 207.

We claim

1. A rotary driving system, comprising:
a fitting base;
a motor having a rotating shaft and fixed to said base;
a sun roller coupled to said rotating shaft;
a plurality of planetary rollers disposed around said sun roller at substantially regular intervals, and supported pivotably by said shaft fixed to said fitting base,
said planetary roller comprising:
a first diameter portion for applying a pressing force against said sun roller; and
a second diameter portion for adjusting the pressing force against said sun roller;
an output shaft pressing said first diameter portion of said planetary rollers and receiving a transferred force;
a ring member interposed between said second diameter portion of said planetary roller and an internal diameter portion of said output shaft and having a tapered portion on a surface for connecting either one of said second diameter portion and said internal diameter portion of said output shaft; and
an auxiliary roller mounted over said second diameter portion of said planetary roller for pressing against said sun roller, said auxiliary roller having a diameter greater than said second diameter portion and being detachably attached to said planetary roller.

2. The rotary driving system as defined in claim 1 wherein said ring member includes a slit portion having a gap, and further comprising clamping means for pressing a plurality of planetary rollers onto a curved surface on an inside diameter of said ring member for reducing the gap of said slit portion.

3. The rotary driving system as defined in claim 15, further comprising:

means for detecting a turning angle of said output shaft, said detecting means disposed inside of said output shaft.

4. A robot comprising:
a base member;
a finger for manipulating a workpiece;
a first arm member mounting said finger thereon and turning said finger with reference to a first axis of said base member;
driving means;
first reduction means provided with an output shaft for driving said first arm member on a driving force from said driving means, said first reduction means comprising:
a sun roller coupled to said driving means;
a plurality of planetary rollers pressed against said sun roller, with
each planetary roller having a large-diameter portion coming in contact with said sun roller and a small-diameter portion coming in contact with said output shaft;
means for adjusting a pressing force between said sun roller and said output shaft, said adjusting means having a ring member placed between said sun roller and said output shaft and provided with a tapered surface on one side, and a member for fixing said ring member to said output shaft.

5. The robot as defined in claim 4, wherein
said output shaft is a cylinder and is coupled to said first arm member; and further comprising
first turning angle detection means connected to said cylindrical output shaft; and
means for controlling a turning position of said first arm member with reference to the first axis according to an output of said first turning angle detection means.

6. A robot, comprising:
a fixed member;
a finger for manipulating a workpiece;
an arm member mounting said finger thereon and turning said finger with reference to a first axis of said fixed member;
a motor mounted on said fixed member;
reduction means for transferring a driving force of said motor to said arm member, said reduction means comprising:
a cylindrical-shaped rotation member journaled inside of said fixed member;
an output shaft mounted on said rotation member for transferring rotation of said arm member;
a reduction part comprising a sun roller journaled inside of said fixed member and said rotation member and coupled to said motor, a plurality of planetary rollers disposed around said sun roller and rotating about their own axes and revolving around said sun roller, and a coupling member for transferring rotation of said planetary rollers to said rotation member; and
hollow turning position detection means mounted to said sun roller for detecting rotation of said output shaft based on revolutions of said planetary rollers.

7. The robot as defined in claim 6, further comprising:
a ring member for pressing said planetary rollers onto the sun roller; and
a reduction ratio of said output shaft being:

$$\frac{d_1}{d_2} + 1$$

where $d_1$ stands for a diameter size of the sun roller, and
$d_2$ stands for an inside diameter size of said ring member.

8. A rotary driving system, comprising:
a fixed member;
a motor mounted on said fixed member;
a sun roller journaled in said fixed member and coupled to said motor;
a plurality of planetary rollers disposed around said sun roller;
pressing means including a pressing ring for pressing said planetary rollers onto the sun roller;
an output shaft mounted on said fixed member and coupled to said planetary rollers;
a coupling member coupling said output shaft to said planetary rollers, said coupling members having a bearing and a shaft portion for journaling said planetary rollers; and
turning position detection means for detecting rotation of said output shaft, with said turning position detection means inputting a turning position of said output shaft through said shaft portion.

9. The rotary driving system as defined in claim 8, wherein:
said coupling member has a rotation member journaled to said fixed member and said sun roller by a bearing, said rotation member mounting said output shaft on said rotation member; and
said planetary rollers are ring-shaped and incorporate said bearing and a shaft portion in said pressing ring, with said shaft portion stretching in the direction of said turning position detection means.

* * * * *

UNITED STATES PATENT AND TRADEMARK OFFICE
CERTIFICATE OF CORRECTION

PATENT NO. : 5,203,748
DATED : April 20, 1993
INVENTOR(S) : Yasuhiro Sawada, et al.

It is certified that error appears in the above-identified patent and that said Letters Patent is hereby corrected as shown below:

COLUMN 1:

Line 58, "roller" should read --rollers--.

COLUMN 2:

Line 32, "prepressure" should read --pre-pressure--.

COLUMN 3:

Line 64, "prepres-" should read --pre-pres- --.

COLUMN 4:

Line 12, "prepressure." should read --pre-pressure.--.
Line 28, "bolt 7C" should read --bolt 7c--.

COLUMN 5:

Line 41, "reduce" should read --reduces--.

COLUMN 6:

Line 62, "position 8," should read --position ß,--.

UNITED STATES PATENT AND TRADEMARK OFFICE
CERTIFICATE OF CORRECTION

PATENT NO. : 5,203,748

DATED : April 20, 1993

INVENTOR(S) : Yasuhiro Sawada, et al.

It is certified that error appears in the above-identified patent and that said Letters Patent is hereby corrected as shown below:

COLUMN 7:

Line 30, "20" should be deleted.
Line 33, "deviation AS" should read --deviation $\Delta S$--.
Line 35, "25" should be deleted.

COLUMN 8:

Line 9, "prepressure" should read --pre-pressure--.

COLUMN 9:

Line 50, "prepressure" should read --pre-pressure--.
Line 51, "compression" should read --compression $\ell$--.

COLUMN 10:

Line 49, "shaft" should read --shaft 5--.
Line 58, ") where a diameter of the sun roller is $d_1$" should be deleted.
Line 66, "roller" should read --roller 3--.

COLUMN 11:

Line 17, "end fa" should read --end 5a--.
Line 34, "slip" should read --slit--.
Line 37, "ring 22 however, "should read --ring 22. However,--.
Line 57, "encoder" should read --encoder 7--.

UNITED STATES PATENT AND TRADEMARK OFFICE
CERTIFICATE OF CORRECTION

PATENT NO. : 5,203,748  Page 3 of 3
DATED : April 20, 1993
INVENTOR(S) : Yasuhiro Sawada, et al.

It is certified that error appears in the above-identified patent and that said Letters Patent is hereby corrected as shown below:

COLUMN 12:

Line 53, "connecting" should read --contacting--.
Line 67, "claim 15," should read --claim 1,--.

COLUMN 14:

Line 35, "members" should read --member--.

Signed and Sealed this

Twenty-ninth Day of March, 1994

Attest:

BRUCE LEHMAN

Attesting Officer  Commissioner of Patents and Trademarks